United States Patent [19]
Ueda

[11] Patent Number: 5,889,824
[45] Date of Patent: Mar. 30, 1999

[54] INTERMITTENT RECEIVING APPARATUS CAPABLE OF REDUCING CURRENT CONSUMPTION

[75] Inventor: Hideki Ueda, Saitama, Japan

[73] Assignee: NEC Corporation, Tokyo, Japan

[21] Appl. No.: 864,959

[22] Filed: May 29, 1997

[30] Foreign Application Priority Data

May 30, 1996 [JP] Japan .................................. 8-136266

[51] Int. Cl.⁶ .......................... H04L 27/06; H04L 27/14; H04L 27/16; H04L 27/22
[52] U.S. Cl. .......................... 375/344; 375/326; 375/327; 375/371; 375/373; 375/374; 375/376; 455/343
[58] Field of Search .................................. 375/324, 326, 375/327, 344, 359, 371, 373, 374, 376; 455/343

[56] References Cited

U.S. PATENT DOCUMENTS

| | | | |
|---|---|---|---|
| 5,402,446 | 3/1995 | Minami | 375/344 |
| 5,500,878 | 3/1996 | Iwasaki | 375/344 |
| 5,541,929 | 7/1996 | Jokura | 370/95.3 |
| 5,594,735 | 1/1997 | Jokura | 370/337 |
| 5,633,898 | 5/1997 | Kishigami et al. | 375/344 |

FOREIGN PATENT DOCUMENTS

| | | | |
|---|---|---|---|
| 0 600 408 | 11/1993 | European Pat. Off. | H04J 3/06 |
| 6-244772 | 9/1994 | Japan . | |

OTHER PUBLICATIONS

Japanese Office Action dated Apr. 28, 1998 with English language translation of Japanese Examiner's comments.

Primary Examiner—Stephen Chin
Assistant Examiner—Michael W. Maddox
Attorney, Agent, or Firm—Whitham, Curtis & Whitham

[57] ABSTRACT

In an intermittent receiving apparatus (10) for intermittently receiving a carrier signal having a carrier frequency ($f_R$) and carrying data as an intermittent received carrier signal so as to alternate between a reception state for a reception time interval ($T_R$) and a nonreception state for a nonreception time interval ($T_{NR}$), an oscillation circuit (16) oscillates a reference signal having a reference frequency ($f_{REF}$) equal to the reproduced clock frequency ($F_{BTR}$). A clock supply circuit (20) intermittently supplies an output clock signal for a predetermined time duration including the reception time interval to a clock reproduction circuit (15) on the basis of the reference signal.

15 Claims, 4 Drawing Sheets

INTERMITTENT RECEIVING APPARATUS CAPABLE OF REDUCING CURRENT CONSUMPTION

BACKGROUND OF THE INVENTION

This invention relates to an intermittent receiving apparatus for use in a digital receiver and, in particular, to an intermittent receiving apparatus for alternately carrying out receiving operation and nonreceiving operation on a received carrier signal.

An intermittent receiving apparatus of the type described is operable in an intermittent operation. That is, the intermittent receiving apparatus alternately carries out reception operation and nonreception operation on a received carrier signal having a carrier frequency. The intermittent receiving apparatus has a received carrier input terminal supplied with the received carrier signal, a reception data output terminal for outputting reception data, and a reception clock output terminal for outputting a reception clock signal having a reception clock frequency. The reception clock frequency is identical with a reproduced clock frequency which is lower than the carrier frequency.

A conventional intermittent receiving apparatus comprises a detection circuit, a clock reproduction circuit, and an oscillation circuit. Supplied to the received carrier input terminal, the received carrier signal is supplied to the detection circuit and the clock reproduction circuit. The oscillation circuit oscillates an oscillation signal having an oscillation frequency which is equal to N times as large as the reproduced clock frequency where N represents a predetermined positive integer. The positive integer N is normally set in a value between thirty-two and three hundred. The oscillation frequency is higher than the carrier frequency.

Responsive to the received carrier signal, the clock reproduction circuit reproduces a reproduced clock signal having the reproduced clock frequency with reference to the oscillation signal. The reproduced clock signal is supplied to the detection circuit. The detection circuit detects the reception data in the received carrier signal using the reproduced clock signal as a detection timing. The reception data is supplied to the reception data output terminal. The reproduced clock signal is supplied to the reception clock output terminal as the reception clock signal.

In the above-mentioned conventional intermittent receiving apparatus, the clock reproduction circuit carries out synchronization holding operation so that the oscillation circuit always oscillates the oscillation signal having the oscillation frequency which is N times the reproduced clock frequency on the nonreception operation as well as the reception operation. As a result, the conventional intermittent receiving apparatus is disadvantageous in that the higher the oscillation frequency becomes, the larger current consumption becomes.

SUMMARY OF THE INVENTION

It is therefore an object of this invention to provide an intermittent receiving apparatus which is capable of reducing current consumption.

Other objects of this invention will become clear as the description proceeds.

On describing the gist of an aspect of this invention, it is possible to understand that an intermittent receiving apparatus intermittently receives a carrier signal having a carrier frequency and carrying data as an intermittent received carrier signal so as to alternate between a reception state for a reception time interval and a nonreception state for a nonreception time interval. The intermittent receiving apparatus comprises a detection circuit supplied with the intermittent received carrier signal and a reproduced clock signal having a reproduced clock frequency lower than the carrier frequency. The detection circuit detects the data in the intermittent received carrier signal on the basis of the reproduced clock signal. A clock reproduction circuit is supplied with the received carrier signal and an output clock signal having an output clock frequency which is higher than the carrier frequency and which is equal to N times as large as the reproduced clock frequency where N represents a positive integer which is not less than two. The clock reproduction circuit reproduces the reproduced clock signal from the intermittent received carrier signal on the basis of the output clock signal.

According to the aspect of this invention, the above-understood intermittent receiving apparatus comprises an oscillation circuit for oscillating a reference signal having a reference frequency which is equal to the reproduced clock frequency. Connected to the oscillation circuit and the clock reproduction circuit, a clock supply circuit intermittently supplies the output clock signal for a predetermined time duration including the reception time interval to the clock reproduction circuit on the basis of the reference signal.

DESCRIPTION OF THE PREFERRED EMBODIMENT

Figure 1:
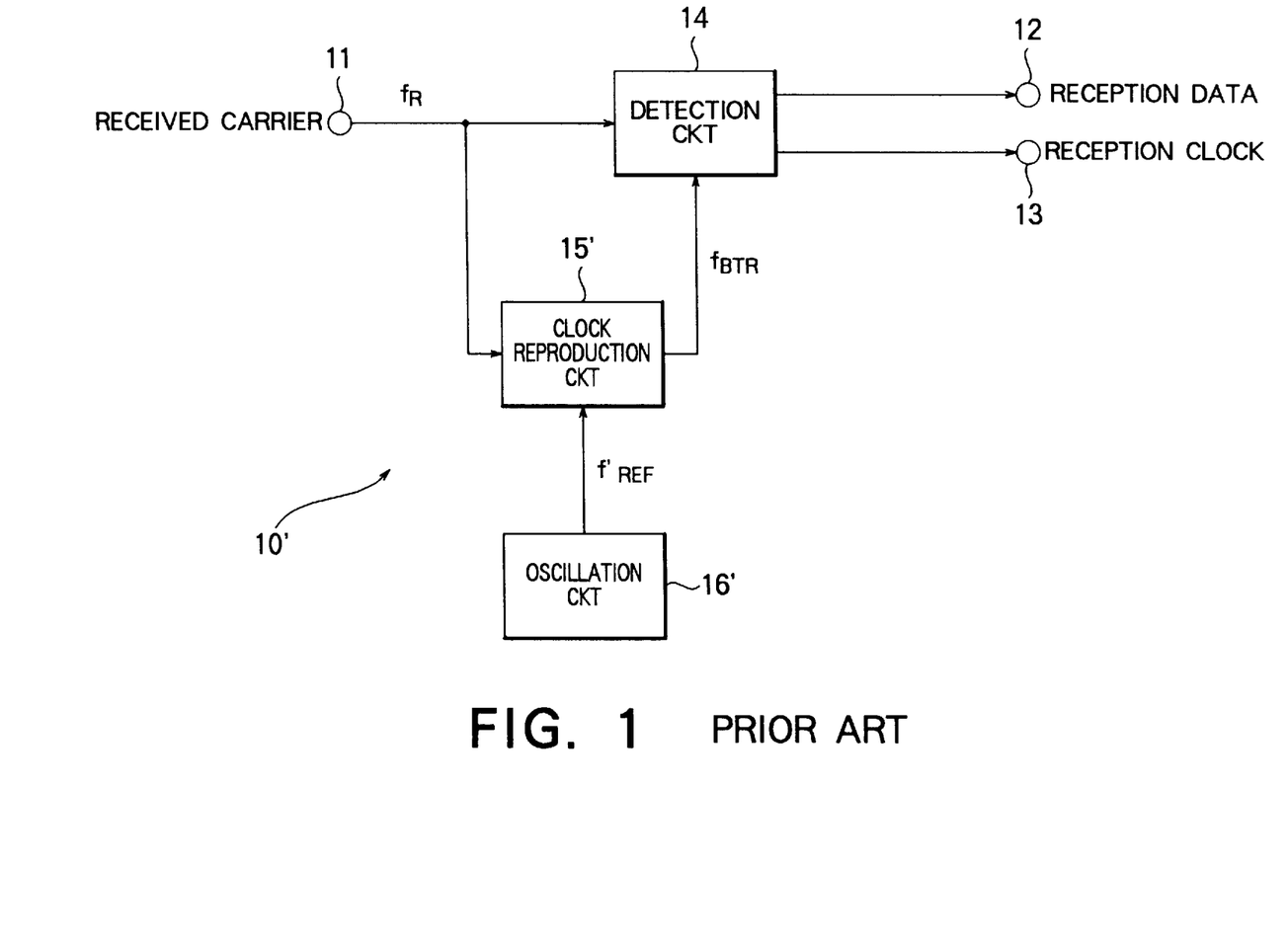
FIG. 1 is a block diagram of a conventional intermittent receiving apparatus.

Referring to FIG. 1, a conventional intermittent receiving apparatus 10' will be described in order to facilitate an understanding of the present invention. The illustrated intermittent receiving apparatus is for use in a digital receiver. The digital receiver may be a digital portable telephone set. In the manner which is well known in the art, the intermittent receiving apparatus is operable in an intermittent operation. That is, the intermittent receiving apparatus alternately carries out reception operation and nonreception operation on a received carrier signal having a carrier frequency $f_R$. In the example being illustrated, the carrier frequency $f_R$ is equal to 450 kHz.

The intermittent receiving apparatus 10' has a received carrier input terminal 11 supplied with the received carrier signal, a reception data output terminal 12 for outputting reception data, and a reception clock output terminal 13 for outputting a reception clock signal having a reception clock signal which is identical with a reproduced clock frequency $f_{BTR}$ of a reproduced clock signal. The reproduced clock frequency $f_{BTR}$ is lower than the carrier frequency $f_R$, namely, $$f_{BTR} < f_R.$$

In the example being illustrated, the reproduced clock frequency $f_{BTR}$ is equal to 21 kHz. The intermittent receiving apparatus 10' comprises a detection circuit 14, a clock reproduction circuit 15', and an oscillation circuit 16'. Supplied to the received carrier input terminal 11, the received carrier signal is supplied to the detection circuit 14 and the clock reproduction circuit 15. The oscillation circuit 16' oscillates an oscillation signal having an oscillation frequency $f'_{REF}$ which is equal to N times as large as the reproduced clock frequency $f_{BTR}$ of the reproduced clock signal, namely, $$f'_{REF}=N{\times}f_{BTR}.$$

where N represents a predetermined positive integer. The positive integer N is normally set in a value between thirty-two and three hundred, both inclusive. In the example being illustrated, the predetermined positive integer N is equal to one hundred and twenty-eight. Under the circumstances, the oscillation frequency $f'_{REF}$ is equal to 2.688 MHz. That is, the oscillation frequency $f'_{REF}$ is higher than the carrier frequency $f_R$, namely, $$f'_{REF}{>}f_R.$$

Responsive to the received carrier signal, the clock reproduction circuit 15' reproduces the reproduced clock signal having the reproduced clock frequency $f_{BTR}$ with reference to the oscillation signal. The reproduced clock signal is supplied to the detection circuit 14. The detection circuit 14 detects the reception data in the received carrier signal using the reproduced clock frequency $f_{BTR}$ as a detection timing. The reception data is supplied to the reception data output terminal 12. In addition, the reproduced clock signal is supplied to the reception clock output terminal 13 as the reception clock signal.

As described above, in the conventional intermittent receiving apparatus 10', the clock reproduction circuit 15' carries out synchronization holding operation so that the oscillation circuit 16' always oscillates the oscillation signal having the oscillation frequency $f'_{REF}$ which is N times the reproduced clock frequency $f_{BTR}$ on the nonreception operation as well as on the reception operation. As a result, the conventional intermittent receiving apparatus 10' is disadvantageous in that the higher the oscillation frequency $f'_{REF}$ becomes, the larger current consumption becomes, as mentioned in the preamble of the instant specification.

Figure 2:
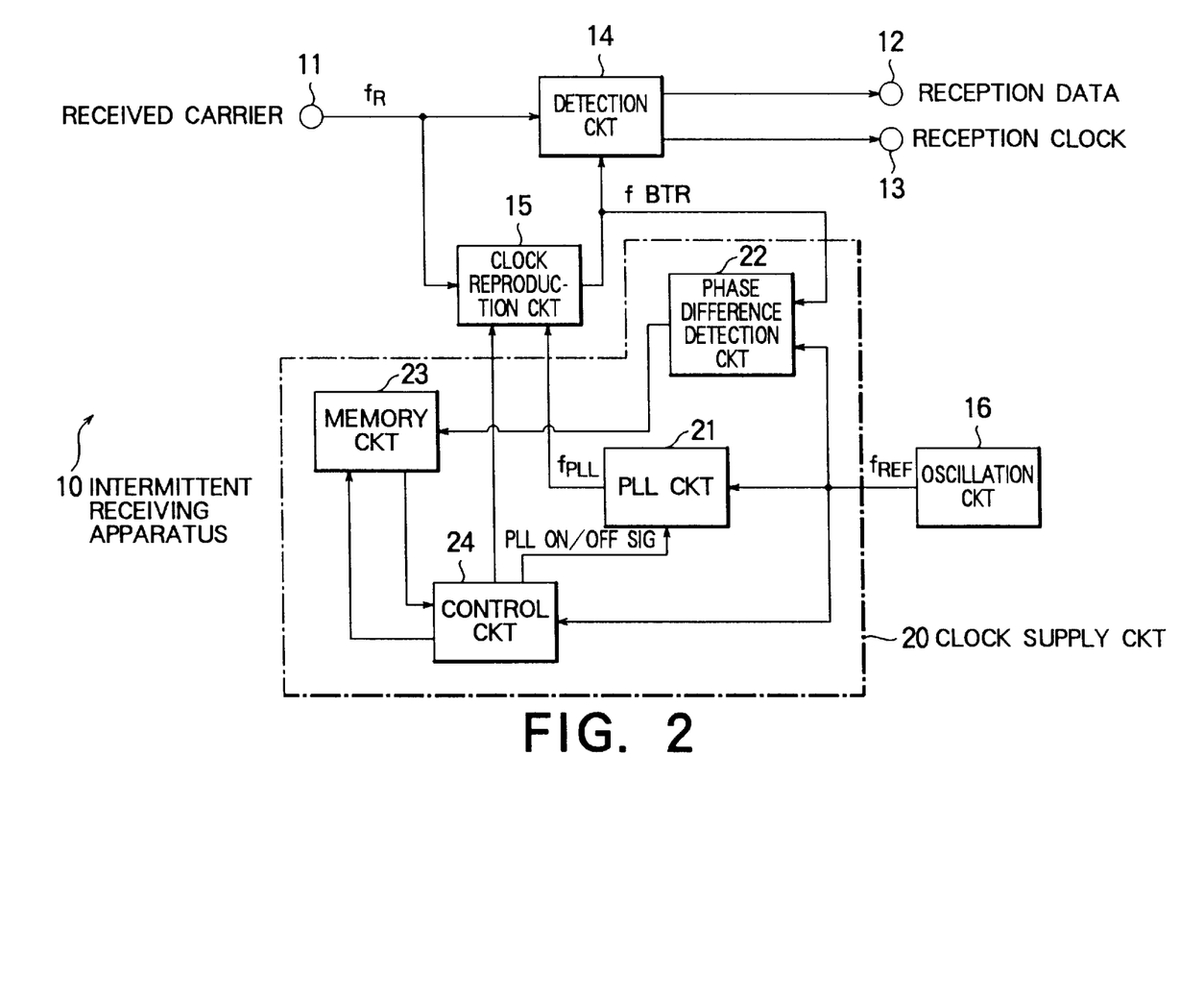
FIG. 2 is a block diagram of an intermittent receiving apparatus according to a preferred embodiment of the present invention.

Turning to FIG. 2, description will proceed to an intermittent receiving apparatus 10 according to a preferred embodiment of this invention. The illustrated intermittent receiving apparatus 10 is for use in a digital receiver. The digital receiver may be a digital portable telephone set. In the manner which is well known in the art, the intermittent receiving apparatus 10 is operable in an intermittent operation. That is, the intermittent receiving apparatus 10 alternately carries out reception operation and nonreception operation on a received carrier signal having a carrier frequency $f_R$. In the example being illustrated, the carrier frequency $f_R$ is equal to 450 kHz.

The intermittent receiving apparatus 10 has the received carrier input terminal 11 supplied with the received carrier signal, the reception data output terminal 12 for outputting reception data, and a reception clock output terminal 13 for outputting a reception clock signal having a reception clock frequency identical with a reproduced clock frequency $f_{BTR}$ of a reproduced clock frequency which will later be described. The reproduced clock frequency $f_{BTR}$ is lower than the carrier frequency $f_R$. In the example being illustrated, the reproduced clock frequency $f_{BTR}$ is equal to 21 kHz.

The intermittent receiving apparatus 10 comprises the detection circuit 14, a clock reproduction circuit 15, an oscillation circuit 16, and a clock supply circuit 20.

Supplied to the received carrier input terminal 11, the received carrier signal is supplied to the detection circuit 14 and the clock reproduction circuit 15. In the manner which will be later described, the clock reproduction circuit 15 reproduces the reproduced clock signal having the reproduce clock frequency $f_{BTR}$. The reproduced clock signal is supplied not only to the detection circuit 14 but also to the clock supply circuit 20. In the manner which is well known in the art, the detection circuit 14 detects the reception data in the received carrier signal using the reproduced clock signal as the detection timing. The detection circuit 14 produces the reception data which is supplied to the reception data output terminal 12. In addition, the detection circuit 14 also produces the reproduced clock signal as the reception clock signal which is supplied to the reception clock output terminal 13.

The oscillation circuit 16 oscillates a reference signal having a reference frequency $f_{REF}$ which is equal to the reproduced clock frequency $f_{BTR}$, namely, $$f_{REF}=f_{BTR}.$$

As a result, the oscillation frequency $f_{REF}$ is equal to 21 kHz. The oscillation signal is supplied to the clock supply circuit 20.

The clock supply circuit 20 comprises a phase-locked loop (PLL) circuit 21, a phase difference detection circuit 22, a memory circuit 23, and a control circuit 24.

The PLL circuit 21 is supplied with the oscillation signal from the oscillation circuit 16. The PLL circuit 21 is also supplied with a PLL on/off signal from the control circuit 24 in the manner which will become clear as the description proceeds. The PLL circuit 21 is put into an ON state when the PLL on/off signal indicates ON. On the other hand, the PLL circuit 21 is put into an OFF state when the PLL on/off signal indicates OFF. In other words, the control circuit 24 supplies the PLL on/off signal to the PLL circuit 21 to make the PLL circuit 21 turn on/off. When the PLL circuit 21 is put into the ON state, the PLL circuit 21 generates a PLL output signal having a PLL output frequency $f_{PLL}$ which is equal to N times as large as the oscillation frequency $f_{REF}$ of the oscillation signal, namely, $$f_{PLL}=N{\times}f_{REF}.$$

Inasmuch as the predetermined positive integer N is equal to one hundred and twenty-eight, the PLL output frequency $f_{PLL}$ is equal to 2.688 MHz. That is, the PLL output frequency $f_{PLL}$ is higher than the carrier frequency $f_R$, namely, $$f_{PLL}{>}f_R.$$

The PLL output signal is supplied to the clock reproduction circuit 15.

The phase difference detection circuit 22 is supplied with the reproduced clock signal and the oscillation signal from the clock reproduction circuit 15 and the oscillation circuit 16, respectively. The phase difference detection circuit 22 detects a phase difference $\Delta\phi$ between the reproduced clock signal and the oscillation signal to produce a phase difference signal indicative of the phase difference $\Delta\phi$. The phase difference signal is supplied to the memory circuit 23.

The memory circuit 23 carries out write-in operation and read-out operation of data under the control of the control circuit 24 in the manner which will later described. In other words, the memory circuit 23 is supplied with a write-in indication signal and a read-out indication signal from the control circuit 24. Responsive to the write-in indication signal, the memory circuit 23 stores the phase difference signal therein as a stored phase difference signal. Responsive to the read-out indication signal, the memory circuit 23 reads the stored phase difference signal therefrom as a read phase difference signal. The read phase difference signal is supplied to the control circuit 24.

The control circuit 24 is also supplied with the reference signal from the oscillation circuit 16. As described above, the control circuit 24 supplies the PLL on/off signal to the PLL circuit 21 and supplies the write-in and the read-out indication signals to the memory circuit 23. Furthermore, the control circuit 24 supplies a timing signal to the clock reproduction circuit 15 with reference to the reference signal on the basis of the read phase difference signal in the manner which will later become clear.

Figure 3:
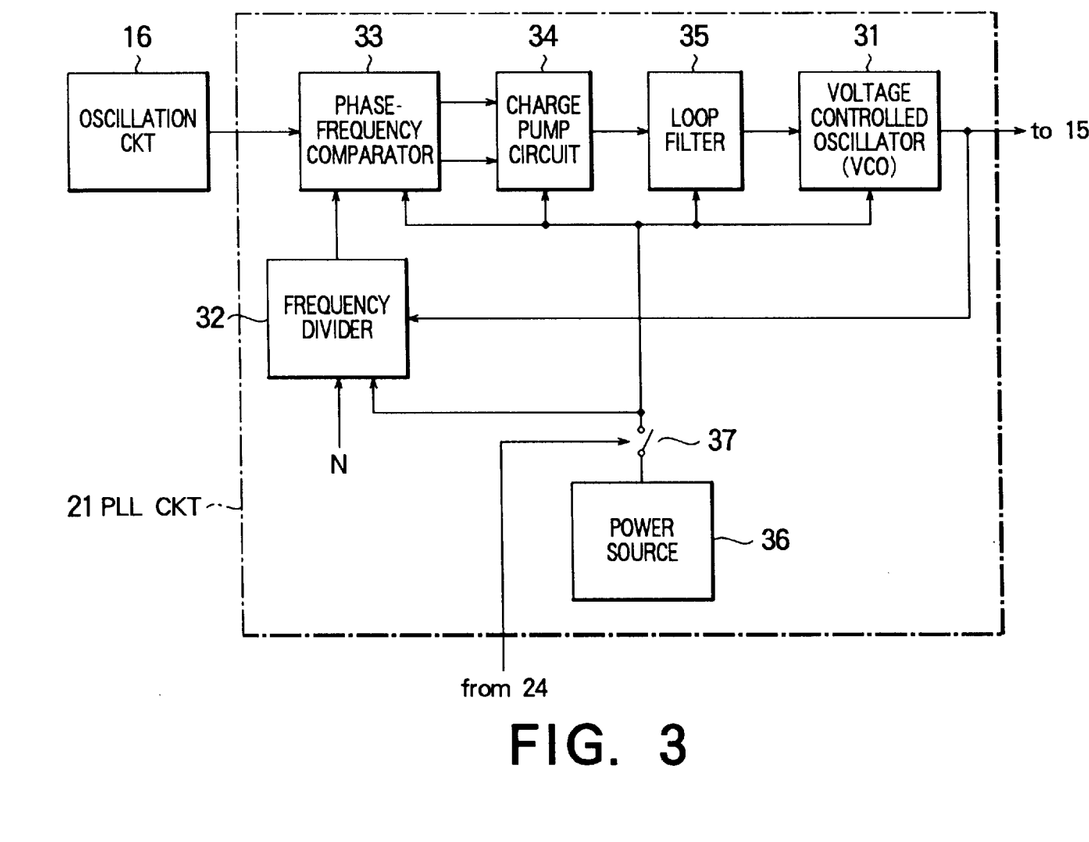
FIG. 3 is a block diagram of a phase-locked loop (PLL) circuit for use in the intermittent receiving apparatus illustrated in FIG. 2.

Turning to FIG. 3, the PLL circuit 21 comprises a voltage controlled oscillator (VCO) 31, a frequency divider 32, a phase-frequency comparator 33, a charge pump circuit 34, a loop filter 35, a power source 36, and a power source switch 37.

The voltage-controlled oscillator (VCO) 31, the frequency divider 32, the phase-frequency comparator 33, the charge pump circuit 34, and the loop filter 35 are connected to the power source 36 through the power source switch 37 and activated by electric power generated by the power source 36 when the power source switch 37 is closed to an ON state. The power source switch 37 is turned on and off in response to the PLL on/off signal supplied from the control circuit 24. Specifically, the power source switch 37 is turned on when the PLL on/off signal indicates ON. The power source switch 37 is turned off when the PLL on/off signal indicates OFF.

The voltage controlled oscillator 31 is supplied with a control voltage signal in the manner which will become clear as the description proceeds. Responsive to the control voltage signal, the voltage controlled oscillator 31 generates a voltage controlled signal having a controllable oscillation frequency. The PLL circuit 21 produces the voltage controlled signal as the PLL output signal having the PLL output frequency $f_{PLL}$ which is equal to the controllable oscillation frequency.

The PLL output signal is also supplied to the frequency divider 32. The frequency divider 32 is also supplied with the predetermined positive integer N as a designated dividing number which defines the PLL output frequency $f_{PLL}$. The frequency divider 32 frequency divides the PLL output signal on the basis of the designated dividing number N to produce a divided signal. In other words, the frequency divider 32 is for frequency dividing the PLL output signal by a factor 1/N.

The phase-frequency comparator 33 is supplied with the reference signal and the divided signal from the oscillation circuit 16 and the frequency divider 32, respectively. The phase-frequency comparator 33 detects a phase-frequency difference between the reference signal and the divided signal to produce a phase-frequency difference signal indicative of the phase-frequency difference. In other words, the phase-frequency difference signal indicates one of lag and lead phases which the divided signal has in comparison with the reference signal.

The phase-frequency difference signal is supplied to the charge pump circuit 34. The charge pump circuit 34 acts as a current flow control circuit which is for controlling flow-in and flow-out of current supplied therefrom/to to produce a current flow control signal. The current flow control signal indicates the flow-out of the current when the phase-frequency difference signal indicates the lag phase. The current flow signal indicates the flow-in of the current when the phase-frequency difference signal indicates the lead phase. The current flow control signal is supplied with the loop filter 35. The loop filter 35 filters the current flow control signal into a filtered signal as the control voltage signal. More particularly, the loop filter 35 comprises a filter capacitor (not shown) which is selectively charged and discharged when the current flow control signal indicates the flow-out and the flow-in of the current, respectively. At any rate, a combination of the charge pump circuit 34 and the loop filter 35 serves as a control voltage supplying circuit for supplying the control voltage signal to the voltage controlled oscillator 31 in response to the phase-frequency difference signal.

As apparent from the above description, if the power source switch 37 is turned on, the PLL circuit 21 produces the PLL output signal having the PLL output frequency $f_{PLL}$ which is equal to N times as large as the reference frequency $f_{REF}$ of the reference signal. As is well known in the art, the PLL circuit 21 has a frequency convergence time interval during which it takes to make the PLL output signal converge so as to have the PLL output frequency $f_{PLL}$ in stable.

Figure 4A:
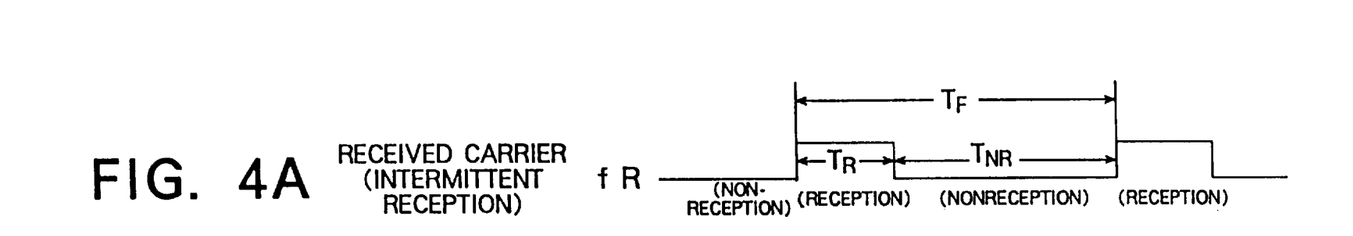
FIGS. 4A through 4D are time charts for use in describing operation of the intermittent receiving apparatus illustrated in FIG. 2.
Figure 4B:
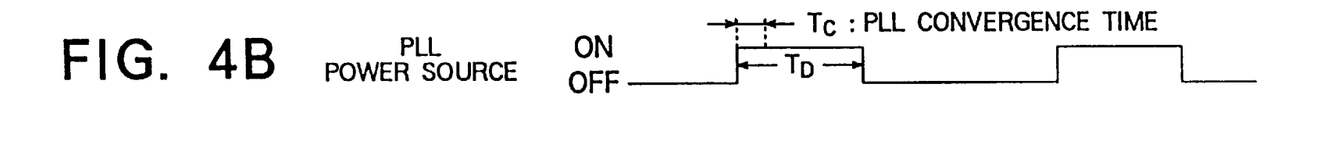
Figure 4C:
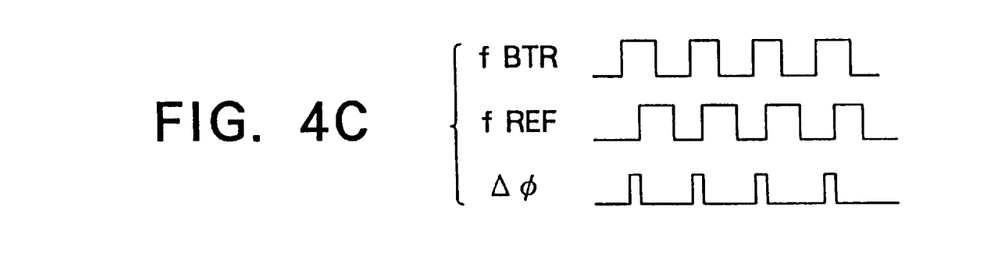
Figure 4D:
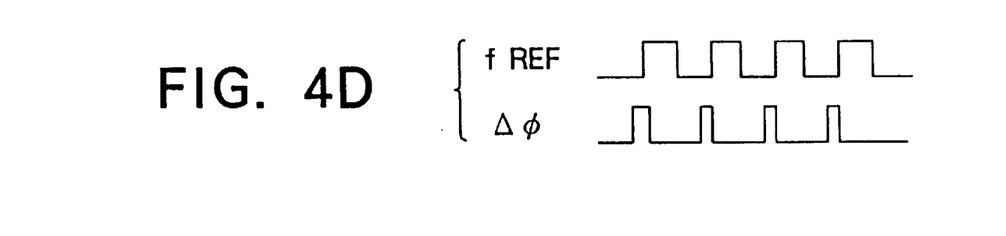

Referring to FIGS. 4A through 4D in addition to FIG. 2, description will proceed to operation of the intermittent receiving apparatus 10 illustrated in FIG. 2. FIG. 4A shows the carrier signal or an intermittent reception timing thereof while FIG. 4B shows a state of the power source 36 of the power source switch 37 (FIG. 3) in the phase-locked loop circuit 21. FIG. 4C shows the reproduced clock signal, the reference signal, and the phase difference Δφ therebetween about a transition time where the power source 36 (the power source switch 37) turns from an ON state to an OFF state. FIG. 4D shows the reference signal and the phase difference Δφ about another transition time where the power source 36 (the power source switch 37) turns from the OFF state to the ON state.

As shown in FIG. 4A, the carrier signal has a frame structure where each frame has a frame period depicted as $T_F$. The frame period $T_F$ is, for example, equal to 720 msec. In the example being illustrated in FIG. 4A, the reception time interval $T_R$ is equal to 20 msec while the nonreception time interval $T_{NR}$ is equal to 700 msec.

In FIG. 4B, it is assumed that the PLL circuit 21 has the frequency convergence time interval $T_C$ equal to 10 msec. In this event, the power source 36 (the power source switch 37) is turned on for the predetermined time duration $T_D$ equal to 30 msec.

In FIGS. 4C and 4D, as described above, the reproduced clock signal has the reproduced clock frequency $f_{BTR}$ equal to 21 kHz and the reference signal also has the reference frequency $f_{REF}$ equal to 21 kHz.

The control circuit 24 carries out a power source control of the phase-locked loop circuit 21 by supplying the PLL on/off signal to the phase-locked loop circuit 21. When the intermittent receiving apparatus 10 is put into the reception state for the reception time interval $T_R$, the phase-locked loop circuit 21 is put into an oscillation state by supplying the PLL on/off signal indicative of ON from the control circuit 24 to the phase-locked loop circuit 21 so as to turn on the power source switch 37 (FIG. 3). On the other hand, when the intermittent receiving apparatus 10 is put into the nonreception state for the nonreception time interval $T_{NR}$, the phase-locked loop circuit 21 is put into an unoscillation state by supplying the PLL on/off signal indicative of OFF from the control circuit 24 to the phase-locked loop circuit 21 so as to turn off the power source switch 37. Specifically, the phase-locked loop circuit 21 has the frequency convergence time interval $T_C$ as described above. Therefore, the control circuit 24 produces the PLL on/off signal indicative of ON at a leading time instant earlier than a time instant where the intermittent receiving apparatus 10 is put into the reception state by the frequency convergence time interval $T_C$ as shown in FIG. 4B.

In addition, the control circuit 24 supplies the memory circuit 23 with the write-in indication signal immediately before being put into the reception state to make the memory circuit 23 store, as the stored phase difference signal, the phase difference signal indicative of the phase difference $\Delta\phi$ between the reproduced clock signal and the reference signal as shown in FIG. 4C. The control circuit 23 produces, in consideration of the frequency convergence time interval $T_C$ of the phase-locked loop circuit 21, the PLL on/off signal indicative of ON immediately before being put into the reception state to turn on the power source switch 37 (FIG. 3) in the manner which is described above. At the same time, the control circuit 24 supplies the read-out indication signal to the memory circuit 23 to read the stored phase difference signal out of the memory circuit 23 as the read phase difference signal as shown in FIG. 4D. Furthermore, the control circuit 24 calculates, on the basis of the read phase difference signal and the reference signal, the phase condition of the reproduced clock signal immediately before being put into the nonreception state to supply the clock reproduction circuit 15 with the bit synchronization timing signal indicative of the phase condition at a timing immediately before being put into the reception state. Responsive to the bit synchronization timing signal, the clock reproduction circuit 15 is activated.

As described above, the clock reproduction circuit 15 is operable on the basis of the bit synchronization timing signal. In other words, the clock supply circuit 20 can hold a synchronization state in the clock reproduction circuit on the nonreception state of the intermittent receiving apparatus 10.

While this invention has thus far been described in conjunction with a preferred embodiment thereof, it will know be readily possible for those skilled in the art to put this invention into various other manners.

What is claimed is:

1. An intermittent receiving apparatus for intermittently receiving a carrier signal having a carrier frequency and carrying data as an intermittent received carrier signal so as to alternate between a reception state for a reception time interval and a nonreception state for a nonreception time interval, said intermittent receiving apparatus comprising:

a detection circuit, supplied with the intermittent received carrier signal and a reproduced clock signal having a reproduced clock frequency lower than the carrier frequency, for detecting said data in the intermittent received carrier signal on the basis of the reproduced clock signal;

a clock reproduction circuit, supplied with the received carrier signal and an output clock signal having an output clock frequency which is higher than the carrier frequency and which is equal to N times as large as the reproduced clock frequency where N represents a positive integer which is not less than two, for reproducing the reproduced clock signal from the intermittent received carrier signal on the basis of the output clock signal;

an oscillation circuit for oscillating a reference signal having a reference frequency which is equal to the reproduced clock frequency; and a clock supply circuit, connected to said oscillation circuit and said clock reproduction circuit, for intermittently supplying the output clock signal for a predetermined time duration including the reception time interval to said clock reproduction circuit on the basis of the reference signal.

2. An intermittent receiving apparatus as claimed in claim 1, wherein said clock supply circuit comprises:

a phase-locked loop (PLL) circuit, connected to said oscillation circuit and supplied with a PLL on/off signal, for intermittently oscillating, in response to the PLL on/off signal, the output clock signal for the predetermined time duration on the basis of the reference signal;

a phase difference detection circuit, connected to said oscillation circuit and said clock reproduction circuit, for detecting a phase difference between the reproduced clock signal and the reference signal to produce a phase difference signal indicative of the phase difference;

a memory circuit, connected to said phase difference detection circuit and supplied with a write-in indication signal and a read-out indication signal, for storing the phase difference signal therein as a stored phase difference signal in the response to the write-in indication signal and for reading the stored phase difference signal therefrom as a read phase difference signal in response to the read-out indication signal; and a control circuit, connected to said oscillation circuit, said phase-locked loop circuit, said memory circuit, and said clock reproduction circuit, for supplying the write-in indication signal and the read-out indication signal to said memory circuit and for supplying the PLL on/off signal to said phase-locked loop circuit, said control circuit supplying a bit synchronization timing signal to said clock reproduction circuit on the basis of the reference signal and the read phase difference signal.

3. An intermittent receiving apparatus as claimed in claim 2, wherein said control circuit supplies the write-in indication signal and the PLL on/off signal indicative of OFF to said memory circuit and said phase-locked loop circuit, respectively, immediately before being put into the nonreception state, said control circuit supplying the read-out indication signal and the PLL on/off signal indicative of ON to said memory circuit and the said phase-locked loop circuit, respectively, immediately before being put into the reception state, whereby said control circuit supplies the clock reproduction circuit with the bit synchronization timing signal indicative of a phase condition of the reproduced clock signal immediately before being put into the nonreception state.

4. An intermittent receiving apparatus as claimed in claim 2, said phase-locked loop circuit includes a power source for activating said phase-locked loop circuit, the power source being turned on when the PLL on/off signal indicates ON, the power source being turned off when the PLL on/off signal indicates OFF.

5. An intermittent receiving apparatus as claimed in claim 2, said phase-locked loop circuit has a frequency convergence time interval for the output frequency, said control circuit producing the PLL on/off signal indicative of ON at a leading time instant earlier than a time instant put into the reception state by the frequency convergence time interval.

6. A digital receiver for intermittently receiving a carrier signal having a carrier frequency and carrying data as an intermittent received carrier signal so as to alternate between a reception state for a reception time interval and a nonreception state for a nonreception time interval, said digital receiver comprising:

a detection circuit, supplied with the intermittent received carrier signal and a reproduced clock signal having a reproduced clock frequency lower than the carrier frequency, for detecting said data in the intermittent received carrier signal on the basis of the reproduced clock signal;

a clock reproduction circuit, supplied with the received carrier signal and an output clock signal having an output clock frequency which is higher than the carrier frequency and which is equal to N times as large as the reproduced clock frequency where N represents a positive integer which is not less than two, for reproducing the reproduced clock signal from the intermittent received carrier signal on the basis of the output clock signal;

an oscillation circuit for oscillating a reference signal having a reference frequency which is equal to the reproduced clock frequency; and a clock supply circuit, connected to said oscillation circuit and said clock reproduction circuit, for intermittently supplying the output clock signal for a predetermined time duration including the reception time interval to said clock reproduction circuit on the basis of the reference signal.

7. A digital receiver as claimed in claim 6, wherein said clock supply circuit comprises:

a phase-locked loop (PLL) circuit, connected to said oscillation circuit and supplied with a PLL on/off signal, for intermittently oscillating, in response to the PLL on/off signal, the output clock signal for the predetermined time duration on the basis of the reference signal;

a phase difference detection circuit, connected to said oscillation circuit and said clock reproduction circuit, for detecting a phase difference between the reproduced clock signal and the reference signal to produce a phase difference signal indicative of the phase difference;

a memory circuit, connected to said phase difference detection circuit and supplied with a write-in indication signal and a read-out indication signal, for storing the phase difference signal therein as a stored phase difference signal in the response to the write-in indication signal and for reading the stored phase difference signal therefrom as a read phase difference signal in response to the read-out indication signal; and a control circuit, connected to said oscillation circuit, said phase-locked loop circuit, said memory circuit, and said clock reproduction circuit, for supplying the write-in indication signal and the read-out indication signal to said memory circuit and for supplying the PLL on/off signal to said phase-locked loop circuit, said control circuit supplying a bit synchronization timing signal to said clock reproduction circuit on the basis of the reference signal and the read phase difference signal.

8. A digital receiver as claimed in claim 7, wherein said control circuit supplies the write-in indication signal and the PLL on/off signal indicative of OFF to said memory circuit and said phase-locked loop circuit, respectively, immediately before being put into the nonreception state, said control circuit supplying the read-out indication signal and the PLL on/off signal indicative of ON to said memory circuit and the said phase-locked loop circuit, respectively, immediately before being put into the reception state, whereby said control circuit supplies the clock reproduction circuit with the bit synchronization timing signal indicative of a phase condition of the reproduced clock signal immediately before being put into the nonreception state.

9. A digital receiver as claimed in claim 7, said phase-locked loop circuit includes a power source for activating said phase-locked loop circuit, the power source being turned on when the PLL on/off signal indicates ON, the power source being turned off when the PLL on/off signal indicates OFF.

10. A digital receiver as claimed in claim 7, said phase-locked loop circuit has a frequency convergence time interval for the output frequency, said control circuit producing the PLL on/off signal indicative of ON at a leading time instant earlier than a time instant put into the reception state by the frequency convergence time interval.

11. A digital portable telephone set for intermittently receiving a carrier signal having a carrier frequency and carrying data as an intermittent received carrier signal so as to alternate between a reception state for a reception time interval and a nonreception state for a nonreception time interval, said digital portable telephone set comprising:

a detection circuit, supplied with the intermittent received carrier signal and a reproduced clock signal having a reproduced clock frequency lower than the carrier frequency, for detecting said data in the intermittent received carrier signal on the basis of the reproduced clock signal;

a clock reproduction circuit, supplied with the received carrier signal and an output clock signal having an output clock frequency which is higher than the carrier frequency and which is equal to N times as large as the reproduced clock frequency where N represents a positive integer which is not less than two, for reproducing the reproduced clock signal from the intermittent received carrier signal on the basis of the output clock signal;

an oscillation circuit for oscillating a reference signal having a reference frequency which is equal to the reproduced clock frequency; and a clock supply circuit, connected to said oscillation circuit and said clock reproduction circuit, for intermittently supplying the output clock signal for a predetermined time duration including the reception time interval to said clock reproduction circuit on the basis of the reference signal.

12. A digital portable telephone set as claimed in claim 11, wherein said clock supply circuit comprises:

a phase-locked loop (PLL) circuit, connected to said oscillation circuit and supplied with a PLL on/off signal, for intermittently oscillating, in response to the PLL on/off signal, the output clock signal for the predetermined time duration on the basis of the reference signal;

a phase difference detection circuit, connected to said oscillation circuit and said clock reproduction circuit, for detecting a phase difference between the reproduced clock signal and the reference signal to produce a phase difference signal indicative of the phase difference;

a memory circuit, connected to said phase difference detection circuit and supplied with a write-in indication signal and a read-out indication signal, for storing the phase difference signal therein as a stored phase difference signal in the response to the write-in indication signal and for reading the stored phase difference signal therefrom as a read phase difference signal in response to the read-out indication signal; and a control circuit, connected to said oscillation circuit, said phase-locked loop circuit, said memory circuit, and said clock reproduction circuit, for supplying the write-in indication signal and the read-out indication signal to said memory circuit and for supplying the PLL on/off signal to said phase-locked loop circuit, said control circuit supplying a bit synchronization timing signal to said clock reproduction circuit on the basis of the reference signal and the read phase difference signal.

13. A digital portable telephone set as claimed in claim 12, wherein said control circuit supplies the write-in indication signal and the PLL on/off signal indicative of OFF to said memory circuit and said phase-locked loop circuit, respectively, immediately before being put into the nonreception state, said control circuit supplying the read-out indication signal and the PLL on/off signal indicative of ON to said memory circuit and the said phase-locked loop circuit, respectively, immediately before being put into the reception state, whereby said control circuit supplies the clock reproduction circuit with the bit synchronization timing signal indicative of a phase condition of the reproduced clock signal immediately before being put into the nonreception state.

14. A digital portable telephone set as claimed in claim 12, said phase-locked loop circuit includes a power source for activating said phase-locked loop circuit, the power source being turned on when the PLL on/off signal indicates ON, the power source being turned off when the PLL on/off signal indicates OFF.

15. A digital portable telephone set as claimed in claim 12, said phase-locked loop circuit has a frequency convergence time interval for the output frequency, said control circuit producing the PLL on/off signal indicative of ON at a leading time instant earlier than a time instant put into the reception state by the frequency convergence time interval.

* * * * *